United States Patent
Chen et al.

(10) Patent No.: US 11,522,333 B2
(45) Date of Patent: Dec. 6, 2022

(54) OPTIMIZATION FOR HIGH REPETITION RATE PULSE RAMAN LASER

(71) Applicant: National Yang Ming Chiao Tung University, Hsinchu (TW)

(72) Inventors: Yung-Fu Chen, Hsinchu (TW); Hsing-Chih Liang, Hsinchu (TW); Chia-Han Tsou, Hsinchu (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 127 days.

(21) Appl. No.: 17/201,476

(22) Filed: Mar. 15, 2021

(65) Prior Publication Data

US 2022/0115831 A1   Apr. 14, 2022

(30) Foreign Application Priority Data

Oct. 13, 2020   (TW) ................................. 109135385

(51) Int. Cl.
*H01S 3/30* (2006.01)
*H01S 3/117* (2006.01)
(Continued)

(52) U.S. Cl.
CPC ............. *H01S 3/117* (2013.01); *H01S 3/1068* (2013.01); *H01S 3/1086* (2013.01); *H01S 3/11* (2013.01);
(Continued)

(58) Field of Classification Search
CPC ...... H01S 3/117; H01S 3/1068; H01S 3/1086; H01S 3/11; H01S 3/1671; H01S 3/30;
(Continued)

(56) References Cited

U.S. PATENT DOCUMENTS

| | | | |
|---|---|---|---|
| 6,618,402 B1* | 9/2003 | Charbonnier | G02B 27/145 372/98 |
| 2003/0035448 A1* | 2/2003 | Yin | H01S 3/109 372/22 |

(Continued)

OTHER PUBLICATIONS

Chen, Y.F., et al. Optics Letters entitled "Criterion for optimizing high-power acousto-optically Q-switched self-Raman yellow lasers with repetition rates up to 500 kHz", vol. 45, No. 7, Apr. 1, 2020, 4 pages.

*Primary Examiner* — Kinam Park
(74) *Attorney, Agent, or Firm* — Bever, Hoffman & Harms, LLP

(57) ABSTRACT

A high repetition rate pulse laser including a linear cavity having a first direction and a second direction opposite to the first direction is disclosed. The pulse laser includes, along the first direction, a first optical component, a gain and Raman medium, an acousto-optic crystal, a first lithium triborate (LBO) crystal and a second optical component. The first optical component allows a pumping light incident in the first direction to transmit therethrough. The gain and Raman medium receives the pumping light from the first optical component, and generates a first infrared base laser light having a first wavelength and a second infrared base laser light having a second wavelength. The acousto-optic crystal receives a radio frequency control signal from a radio frequency controller, wherein the radio frequency control signal has a signal period including a low level period and a high level period.

20 Claims, 6 Drawing Sheets

(51) Int. Cl.
*H01S 3/106* (2006.01)
*H01S 3/11* (2006.01)
*H01S 3/16* (2006.01)
*H01S 3/108* (2006.01)
H01S 3/109 (2006.01)
H01S 3/102 (2006.01)

(52) U.S. Cl.
CPC .............. *H01S 3/1671* (2013.01); *H01S 3/30* (2013.01); *H01S 3/109* (2013.01); *H01S 3/1022* (2013.01); *H01S 3/1611* (2013.01); *H01S 3/1673* (2013.01)

(58) Field of Classification Search
CPC ...... H01S 3/1022; H01S 3/109; H01S 3/1611; H01S 3/1673; H01S 3/094076; H01S 3/094084; H01S 3/09415
See application file for complete search history.

(56) References Cited

U.S. PATENT DOCUMENTS

| | | | |
|---|---|---|---|
| 2004/0146076 A1* | 7/2004 | Dudley | H01S 3/09415 372/75 |
| 2005/0078718 A1* | 4/2005 | Spinelli | G02F 1/3532 372/21 |
| 2011/0122896 A1* | 5/2011 | Mao | H01S 3/0812 372/12 |

\* cited by examiner

OPTIMIZATION FOR HIGH REPETITION RATE PULSE RAMAN LASER

CROSS-REFERENCE TO RELATED APPLICATION AND CLAIM OF PRIORITY

The application claims the benefit of Taiwan Patent Application No. 109135385, filed on Oct. 13, 2020, at the Taiwan Intellectual Property Office, the disclosures of which are incorporated herein in its entirety by reference.

FIELD OF THE INVENTION

The present invention is related to a pulse Raman laser, and more particularly to a pulse Raman laser apparatus for generating high power and high repetition rate.

BACKGROUND OF THE INVENTION

Pulsed lasers with high pulse repetition rates have high practical value, and are currently deployed in such fields as material processing, micro-machining, micro-photolithography, and even medical technology applications. A conventional laser device 10 for generating visible laser lights is shown in FIG. 1. The diode laser source 1 on the far left of FIG. 1 provides a pumping light $L_{pump}$ with a wavelength of 808 nanometer (nm) through the first optical element 130 and entering the linear cavity 110 formed by the first optical element 130 and the second optical element 150. The cavity 110 is sequentially arranged with a gain and Raman medium 120 and a lithium triborate (LBO) crystal 180 and another LBO crystal 160. The first optical element 130 may be disposed with a layer of optical film 131, which has high transmittance (the reflectivity is as low as less than 0.2%) in the first direction to the pumping light $L_{pump}$ (having a wavelength of 808 nm) from the diode laser source 1 and incident in the first direction, and is suitable for allowing the pumping light $L_{pump}$ to pass therethrough and be incident along the first direction.

The gain and Raman medium 120 receives the pumping light $L_{pump}$ from the first optical element 130, and generates a first infrared base laser light $L_{base1}$ with a first wavelength and a second infrared laser light $L_{base2}$ with a second wavelength. For instance, the wavelength of the pumping light $L_{pump}$ provided by the diode laser source 1 is 808 nanometer, and the gain and Raman medium 120 includes neodymium doped vanadate (for example, Nd: YVO$_4$), which not only can absorb the energy of the pumping light $L_{pump}$ via the doped material and convert it to a first infrared base laser light $L_{base1}$ having a wavelength of about 1064 nm, but also can rely on self-stimulated Raman scattering to generate a second infrared base laser light $L_{base2}$ having a wavelength of approximately 1176 when the reflectivity of the first optical element 130 and the second optical element 150 of the linear cavity 110 for the first infrared base laser light $L_{base1}$ reaches 99.8% or more, that is, when the first infrared base laser light $L_{base1}$ can be effectively locked in the linear cavity 110 to form a standing wave.

These two base laser lights existing in the linear cavity 110 can be used as a means of forming laser light with different wavelengths of visible lights. From another point of view, the first infrared base laser light $L_{base1}$ and the second infrared base laser light $L_{base2}$ are reflected back and forth among the linear cavity 110, and the distance between the first optical element 130 and the second optical element 150 is such that the two base laser lights form a standing wave to maintain a certain power thereof. The energy of the two base laser lights may continuously be increased as long as the pumping light $L_{pump}$ is continuously injected into the linear cavity 110.

The LBO crystal 180 can be a sum frequency crystal formed with a particular cutting angle. The sum frequency crystal, or the LBO crystal 180 receives the first and second infrared base laser light $L_{base1}/L_{base2}$ from the gain and Raman medium 120, and generates a first visible laser light L1 having a third wavelength. For example, in the aforementioned embodiment, when the wavelengths of the first and second infrared base laser light $L_{base1}/L_{base2}$ are 1064 and 1176 nm respectively, the first visible laser light L1 generated by the sum frequency crystal has a wavelength of about 559 nm.

The another LBO crystal 160 is a lithium borate crystal (LBO) crystal formed with another special cutting angle different from that for the LBO crystal 180, receives the first infrared base laser light $L_{base1}$, and generates a second visible laser light L2 having a fourth wavelength. According to the above example, when the first infrared base laser light $L_{base1}$ has a wavelength of about 1064 nm, the second visible laser light L2 generated by the another crystal 160 via frequency doubling has a wavelength of about 532 nm. Laser lights with wavelengths of 532 and 559 nm are of different color in the visible range and of great value in medical applications such as retinal photocoagulation in the fields of ophthalmology and dermatology.

The thin film stack 151 on the second optical element 150 is a saturable semiconductor absorber with an initial transmittance. When the intensity of the laser light L1/L2 exceeds a threshold, it will superimpose in a specific relationship and generate pulses. At this moment, the thin film stack 151 will be under a high-penetration state, and a pulsed output laser light $L_{1ext}/L_{2ext}$ is released through the second optical element 150. However, it is hard to generate high pulse repetition rate and high power pulsed laser light with the abovementioned element configuration.

Therefore, how to avoid the above disadvantages is a technical problem that needs to be solved.

SUMMARY OF THE INVENTION

The present invention provides a laser apparatus having a linear cavity and being able to generate pulsed laser lights with high-pulse repetition rate and high-power, which can effectively overcome the mentioned disadvantages and also provides at least two visible laser light as well as infrared or ultraviolet laser lights, and reduces the issues of power loosing and cost.

In accordance with one aspect of the present invention, a high repetition rate pulse laser including a linear cavity having a first direction and a second direction opposite to the first direction is provided. The pulse laser includes, along the first direction, a first optical component, a gain and Raman medium, an acousto-optic crystal, a first lithium triborate (LBO) crystal and a second optical component. The first optical component allows a pumping light incident in the first direction to transmit therethrough. The gain and Raman medium receives the pumping light from the first optical component, and generates a first infrared base laser light having a first wavelength and a second infrared base laser light having a second wavelength. The acousto-optic crystal receives a radio frequency control signal from a radio frequency controller, wherein the radio frequency control signal has a signal period including a low level period and a high level period, and the acousto-optic crystal undergoes a corresponding turn-on time to allow any light to pass therethrough during the low level period. The first lithium triborate (LBO) crystal receives the first and the second infrared base lasers, and generates a visible laser light having a third wavelength. The first optical component has a first high reflectivity for a first wave band covering the first and the second wavelengths in respect of the second direction and a second high reflectivity for a second wave band covering the third wavelength. The gain and Raman medium has a first high transmittance for the first wave band and a third high reflectivity for the second wave band in respect of the second direction. The second optical component has a fourth high reflectivity for the first wave band and an initial transmittance, and when an intensity of the visible laser light reaches a threshold, the second optical component has a second high transmittance for the second wavelength in respect of the first direction so as to release an output laser pulse along the first direction. The intensity of the visible laser light achieves the threshold during the turn-on time of the acousto-optic crystal.

In accordance with another aspect of the present invention, a linear cavity for generating a high repetition rate laser light is provided. The linear cavity includes, along a first direction, a first optical component, a gain and Raman medium, an acousto-optic crystal, a first lithium triborate (LBO) crystal, a second LBO and a second optical component. The first optical component is configured to allow a pumping light incident in the first direction to transmit therethrough. The gain and Raman medium receives the pumping light from the first optical component, and generates a first infrared base laser light having a first wavelength and a second infrared base laser light having a second wavelength. The acousto-optic crystal receives a radio frequency control signal from a radio frequency controller, wherein the radio frequency control signal has a signal period including a low level period and a high level period, and the acousto-optic crystal undergoes a corresponding turn-on time to allow any light to pass therethrough during the low level period. The first lithium triborate (LBO) crystal receives the first and the second infrared base lasers, and generates a first visible laser light having a third wavelength. The second LBO crystal receives the first and the second infrared base lasers, and generates an ultraviolet laser light having a fourth wavelength. The first optical component has a first high reflectivity for a first wave band covering the first and the second wavelengths in respect of a second direction opposite to the first direction and a second high reflectivity for a second wave band covering the third and the fourth wavelengths. The gain and Raman medium has a first high transmittance for the first wave band and a third high reflectivity for the second wave band in respect of the second direction. The second optical component has a fourth high reflectivity for the first wave band and an initial transmittance, and when an intensity of the ultraviolet laser light reaches a threshold, the second optical component has a second high transmittance for the second wavelength in respect of the first direction, so as to release an output laser pulse along the first direction. The intensity of the first visible laser light achieves the threshold during the turn-on time of the acousto-optic crystal.

In accordance with yet another aspect of the present invention, a high repetition rate pulse laser including a linear cavity having a first direction and a second direction opposite to the first direction is provided. The high repetition rate pulse laser comprises, along the first direction, a first optical component, a gain medium, an acousto-optic crystal and a second optical component. The first optical component receives a pumping light incident in the first direction, and allows the pumping light to transmit therethrough, wherein the pumping light has a first wavelength. The gain medium receives the pumping light from the first optical component, and generates a base laser light having a second wavelength. The acousto-optic crystal receives the base laser light from the gain medium, and receives a radio frequency control signal to determine whether the acousto-optic crystal is at a transparent condition or a non-transparent condition based on the radio frequency control signal. The second optical component is configured to form therebetween a laser resonant cavity with the first optical component, wherein the second optical component has a light-intensity threshold for the base laser light to be transmitted therethrough, and an intensity of the base laser light reaches the light-intensity threshold when the acousto-optic crystal is under the transparent condition.

The high repetition rate pulse Raman laser provided by the present invention is applicable for the use of medical surgery or industrial manufacturing, so it has industrial utilization.

The objectives and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; they are not intended to be exhaustive or to be limited to the precise form disclosed.

Figure 1:
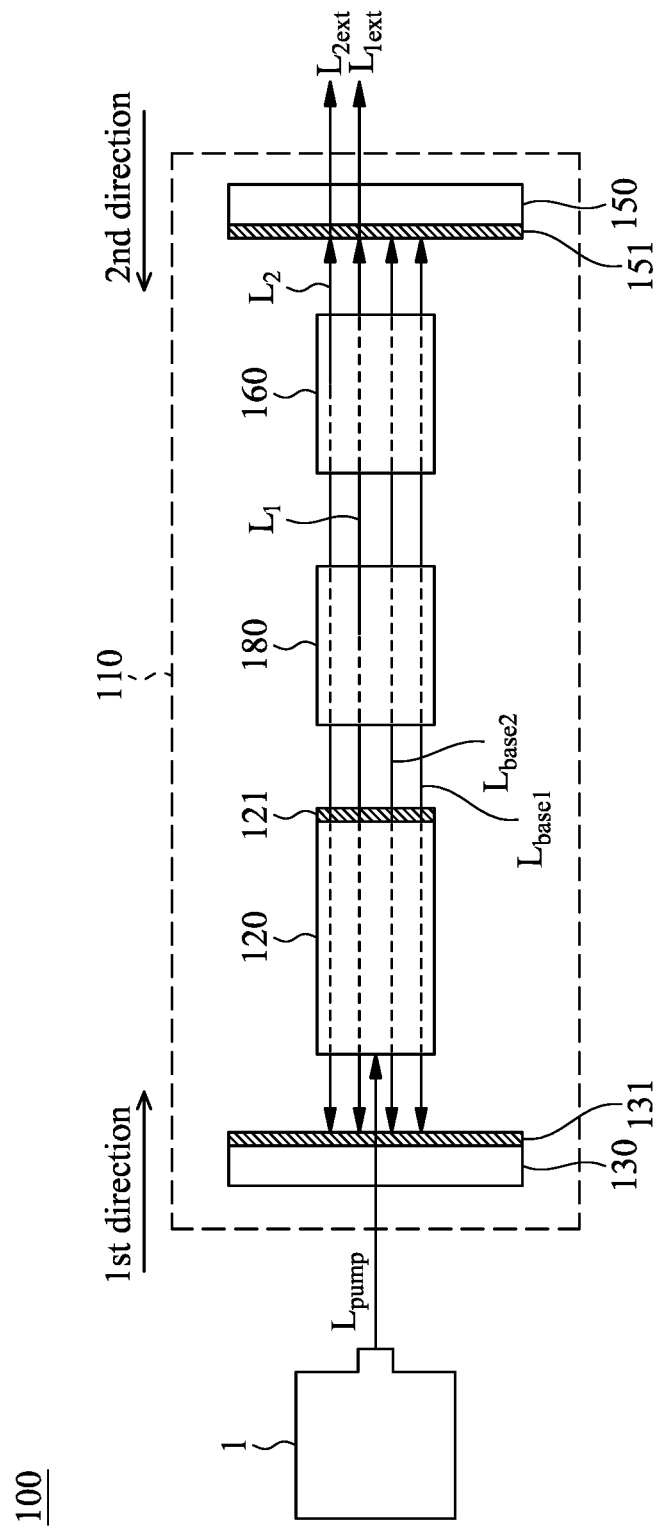
FIG. 1 is a schematic diagram showing a laser device for generating visible laser lights according to the prior art.
Figure 2:
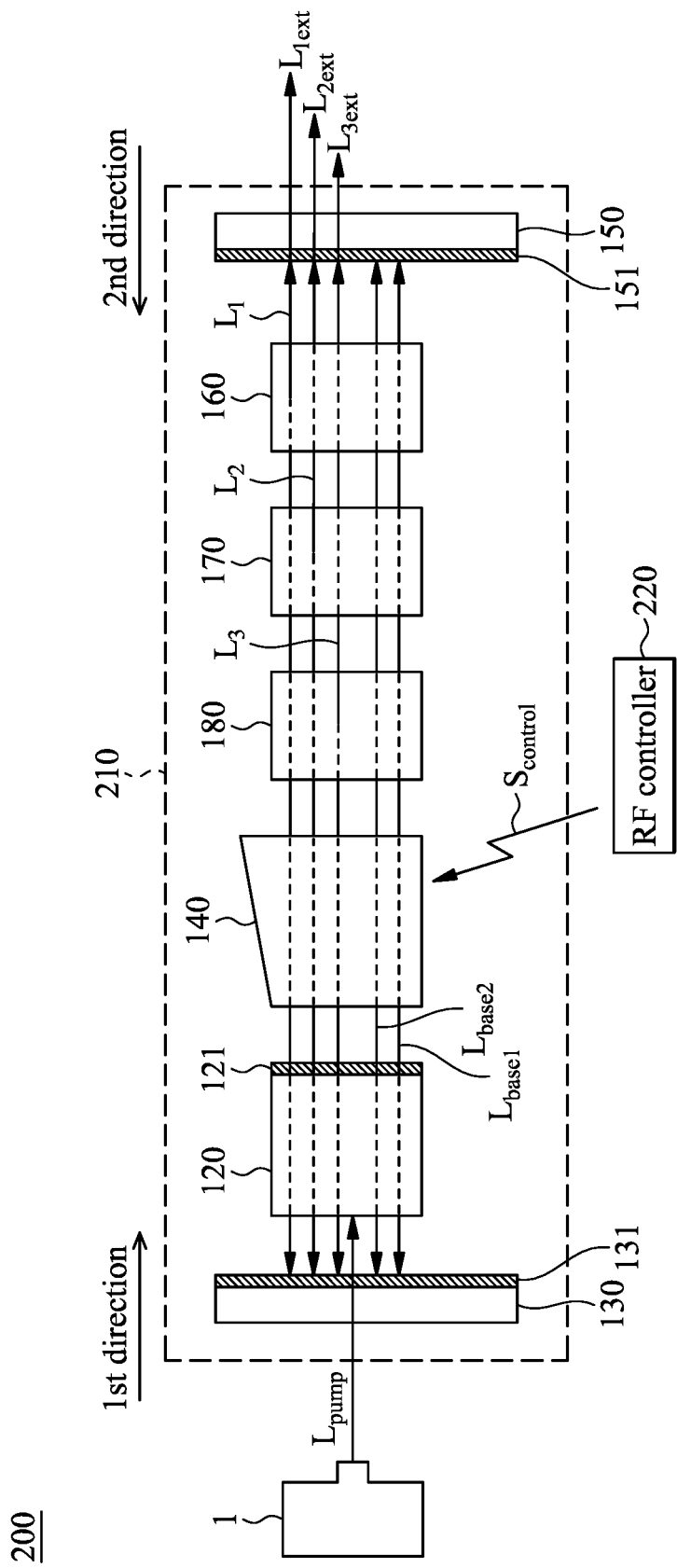
FIG. 2 is a schematic diagram of some embodiments of the high repetition rate pulse laser according to the present invention.

Please refer to FIG. 2, which shows some embodiments of the high pulse repetition rate laser according to the present invention. The high pulse repetition rate laser 200 includes a linear cavity 210 having a first direction and a second direction opposite to the first direction. The linear cavity 210 along the first direction includes a first optical component 130, a gain and Raman medium 120, an acousto-optic crystal 140, a first lithium triborate (LBO) crystal 160, a second LBO crystal 170, a third LBO crystal 180 and a second optical component 150.

The first optical element 130 is configured to receive and allow the pumping light $L_{pump}$ (having a wavelength of 808 nm) from the diode laser source 1 and incident in the first direction to transmit therethrough. The gain and Raman medium 120 includes neodymium doped vanadate (for example, Nd: $YVO_4$), which can absorb the energy of the pumping light $L_{pump}$ via the doped material and convert it to a first infrared base laser light $L_{base1}$ having a wavelength of about 1064 nm. According to an embodiment, if one needs to obtain an infrared pulse laser light, he may operate the linear cavity 210 to be a high repetition rate pulse laser directly based on the first infrared base laser light $L_{base1}$ only.

According to another embodiment, the gain and Raman medium 120 includes neodymium doped vanadate (for example, Nd: $YVO_4$), which not only can absorb the energy of the pumping light $L_{pump}$ via the doped material and convert it to a first infrared base laser light $L_{base1}$ having a wavelength of about 1064 nm, but also can rely on self-stimulated Raman scattering to generate a second infrared base laser light $L_{base2}$ having a wavelength of approximately 1176 when the reflectivity of the first optical element 130 and the second optical element 150 of the linear cavity 210 for the first infrared base laser light $L_{base1}$ reaches 99.8% or more, that is, when the first infrared base laser light $L_{base1}$ can be effectively locked in the linear cavity 210 to form a standing wave. These two base laser lights existing in the linear cavity 210 can be used as a means of forming laser light with different wavelengths of visible lights. In one embodiment, the gain and Raman medium 120 has an optical film 121 on the side away from the first optical element 130, and the reflectivity of the optical film 121 to the first infrared base laser light $L_{base1}$ and the second infrared base laser light $L_{base2}$ is less than 0.03%.

The first infrared base laser light $L_{base1}$ and the second infrared base laser light $L_{base2}$ can be reflected back and forth in the linear cavity 210 under appropriate device configuration arrangements. According to one embodiment of the present invention, the second optical element 150 is a lens and has a layer of thin film stack 151 on the surface facing the first direction. The reflectivity of the second optical element 150 for a wavelength range (for example, 1060-1180 nm) covering the first infrared base laser light $L_{base1}$ and the second infrared base laser light $L_{base2}$ can be up to 99.9%. The distance between the first optical element 130 and the second optical element 150 is such that the two base laser lights form a standing wave to maintain a certain power thereof. The energy of the two base laser lights $L_{base1}$, $L_{base2}$ can be continuously increased as long as the pumping light $L_{pump}$ is continuously injected into the linear cavity 210.

FIG. 2 shows different embodiments of the high pulse repetition rate laser according to the present invention. Please also refer to FIG. 3, in order to overcome the problem of high power and high pulse repetition rate laser pulse light in the prior art, the linear cavity 210 of the high pulse repetition rate laser 200 of the present invention has an acousto-optic crystal 140 disposed after the gain Raman medium 120 gain along the optical path in the first direction. The acousto-optic crystal 140 can be used as a switch. According to the embodiment, the acousto-optic crystal 140 receives the radio frequency control signal $S_{control}$ from the radio frequency controller 220. The radio frequency control signal $S_{control}$ has a high pulse repetition rate (for example, 100-500 kHz) signal period Tp including a low level period and a high level period.

One character of the acousto-optic crystal 140 is being able to be controlled (either by wire or wirelessly) by the radio frequency control signal $S_{control}$ with specific frequency. The acousto-optic crystal 140 is maintained at a transparent condition allowing any light to pass therethrough when the radio frequency control signal $S_{control}$ is under a condition of low level or close to zero, and forms a gating to block any light when radio frequency control signal $S_{control}$ is under a condition of high level.

Thus, when the acousto-optic crystal 140 receives the radio frequency control signal $S_{control}$, it can undergo a corresponding turn-on time $T_{go}$ according to the low-level period of the signal period $T_p$ so that any light can pass therethrough between the first optical element 130 and the second optical element 150. However, when the radio frequency control signal $S_{control}$ is under the high-level condition during the signal period $T_p$, the acousto-optic crystal 140 blocks the first infrared base laser light $L_{base1}$ or the second infrared base laser light $L_{base2}$ along the first direction, and therefore the light energy due to the pumping light $L_{pump}$ from the diode laser source 1 continuously injected into the linear cavity 210 is accumulated on the left side of the linear cavity 210 in the figure, resulting in continuous energy increasing of the first infrared base laser light $L_{base1}$ or the second infrared base laser light $L_{base2}$.

Figure 3:
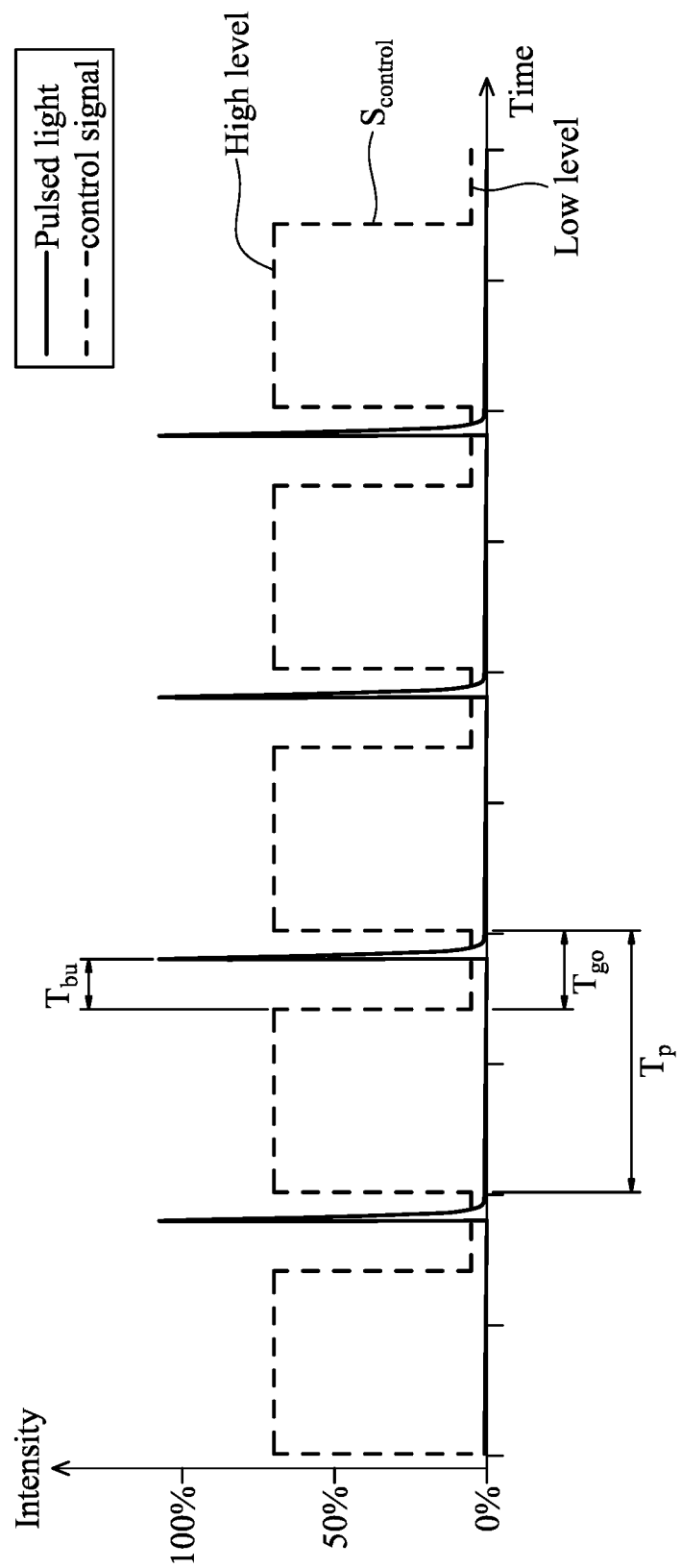
FIG. 3 is a schematic diagram showing the control signal and the period of output pulsed light according to an embodiment of the present invention.

Therefore, as shown in FIG. 3, during the period when the radio frequency control signal $S_{control}$ is in the high-level state, it can be regarded as the energy accumulating stage for the laser cavity, giving the laser cavity sufficient time to store energy, and then when the radio frequency control signal $S_{control}$ switches to the low-level state, the acousto-optic crystal 140 becomes a transparent state, so that the first infrared base laser light $L_{base1}$ or the second infrared base laser light $L_{base2}$ with high energy forms a standing wave in the linear cavity 210 and is continuously input into the first LBO crystal 160, the second LBO crystal 170 or the third LBO crystal 180 disposed in the right half of the linear cavity 210.

According to an embodiment, the linear cavity 210 is equipped with the first LBO crystal 160 only, receiving the first and the second infrared base laser lights $L_{base1}$, $L_{base2}$, and generating visible laser light L1 with a third wavelength (588 nm, 559 nm or 532 nm for example). The LBO crystals can be made into doubling harmonic generation crystals or sum frequency generation crystals, after being cut with particular cutting angles. When configured to be used as a doubling harmonic generation crystal, the first LBO 160 can generate visible laser light L1 having the wavelength of 588 nm (double harmonic for the second infrared base laser light $L_{base2}$ with the wavelength of 1176 nm) or 532 nm (double harmonic for the first infrared base laser light $L_{base1}$ with the wavelength of 1064 nm). When configured to be used as a sum frequency generation crystal, the first LBO 160 can generate visible laser light L1 having the wavelength of 549 nm (sum frequency for the first and the second infrared base laser lights $L_{base1}$, $L_{base2}$).

When the intensity of the visible laser light L1 exceeds a threshold value, pulses will be formed due to superimposing in a specific relationship, the film stack 151 of the second optical element 150 will be in a high penetration (for example, 0.3% or lower reflectivity) state, and allows an output laser pulse light $L1_{ext}$ to pass through the second optical element 150 to exit the linear cavity 210. In one embodiment, the reflectivity of the optical film 121 of the gain and Raman medium 120 to the visible laser light L1 is above 0.98% to prevent the gain and Raman medium 120 from absorbing the visible laser light L1.

Please refer to FIG. 3 again. The multiple signal period Tp as well as the high and low levels of the radio frequency control signal $S_{control}$ is illustrated by the dotted line, while the intensity of the pulsed light $L_{1ext}$ exiting the linear cavity 210 by the solid line. When the radio frequency control signal $S_{control}$ is switched from the high-level state to the low-level state, the intensity of the visible laser light L1 generated by the first LBO crystal 160 gradually increases in the linear cavity 210, reaches the threshold after undergoing a built-up period of $T_{bu}$, and eventually passes through the second optical element 150. The laser pulse emitting from the linear cavity 210 is denoted by the output laser pulse light $L1_{ext}$. As illustrated in FIG. 3, because the linear cavity 210 is controlled by the radio frequency control signal $S_{control}$, the pulse period of the output laser pulse light $L1_{ext}$ is the same as the signal period Tp of the radio frequency control signal $S_{control}$.

Notably, in order to allow the visible laser light L1 resonating in the linear cavity 210 to have enough time to develop the intensity so as to reach the threshold, the low level period in the signal period Tp of the radio frequency control signal $S_{control}$, which is also the turn-on period Tgo of the acousto-optic crystal 140, must be at least greater than the built-up period $T_{bu}$ of the visible laser light L1, so that the output pulse light $L1_{ext}$ may occur. In addition, in order to achieve the effect of high pulse repetition rate (100-500 KHz for example), the energy of the first or second infrared basic laser light $L_{base1}/L_{base2}$ used to generate the visible laser light L1 in the linear cavity 210 must be adequately high, so the high-level period in the period Tp of the radio frequency control signal $S_{control}$ (that is, the period of Tp minus the turn-on period Tgo) must also be properly arranged. One concept of the present invention for realizing the high pulse repetition rate laser is to optimize the turn-on period Tgo of the acousto-optic crystal 140 so as to render a longer period for the laser cavity to accumulate energy within each signal period Tp, i.e., the period of Tp minus Tgo. Thus, an output pulse laser light can be also obtained as well.

Figure 4:
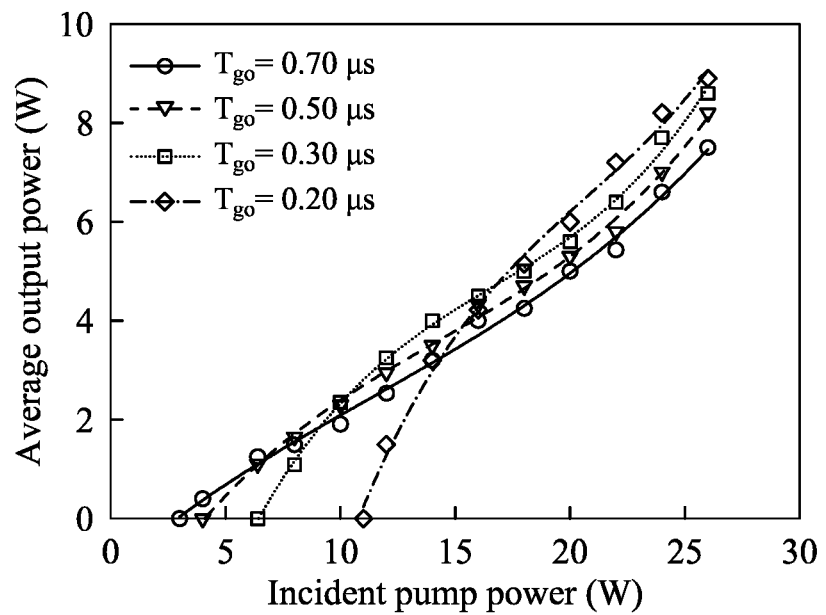
FIG. 4 shows a schematic diagram of the output power at a pulse repetition rate of 200 KHz of a laser device made according to an embodiment of the present invention.

Please refer to FIG. 4, which shows that the output light wavelength of the laser device made according to the present invention is about 588 nanometers at a pulse repetition rate of 200 KHz, as shown by the experimental data of the incident pumping light $L_{pump}$ power versus the pulsed light output power by trying different turn-on time Tgo (0.2/0.3/0.5/0.7 microseconds). It is observed that, using incident pump light $L_{pump}$ with a power of about 26 watts, when the turn-on time Tgo is 0.7 microsecond, the obtained pulsed light output power is at least 20% lower than the pulsed light output power obtained when the turn-on time Tgo is 0.2 microsecond.

Accordingly, under the same pulse repetition, the lower turn-on time Tgo indicates the longer period for the laser cavity to accumulate energy. Therefore, the laser device according to the present invention can achieve a pulse repetition rate of 200 KHz by controlling the turn-on time Tgo of the acousto-optic crystal 140 and thus increase the output power of pulsed light. As shown in FIG. 4, if a higher pulsed light output power is not required (for example, only an output power of less than 2 watts is needed), a low-power incident pumping light $L_{pump}$ can be used to achieve a pulse repetition rate of 200 KHz.

Figure 5:
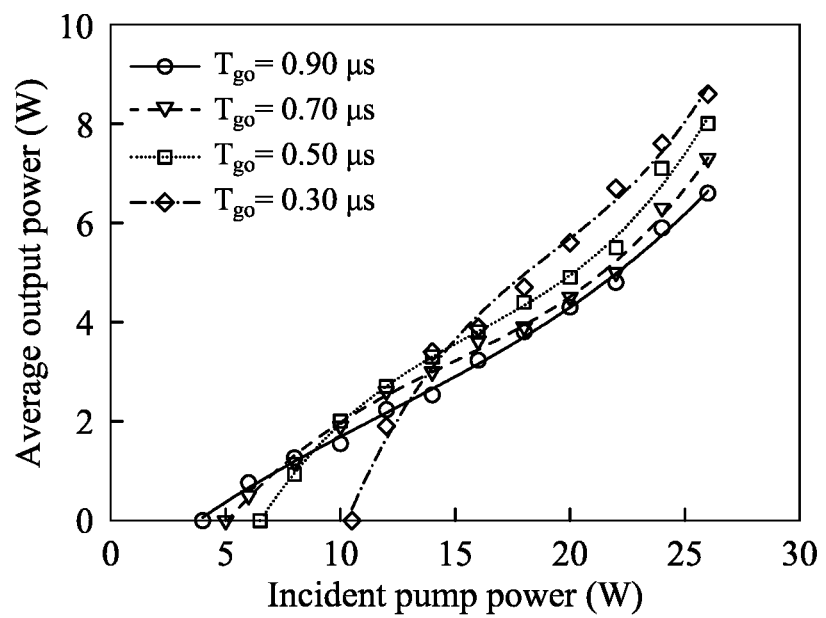
FIG. 5 shows a schematic diagram of the output power at a pulse repetition rate of 300 KHz of a laser device made according to an embodiment of the present invention.
Figure 6:
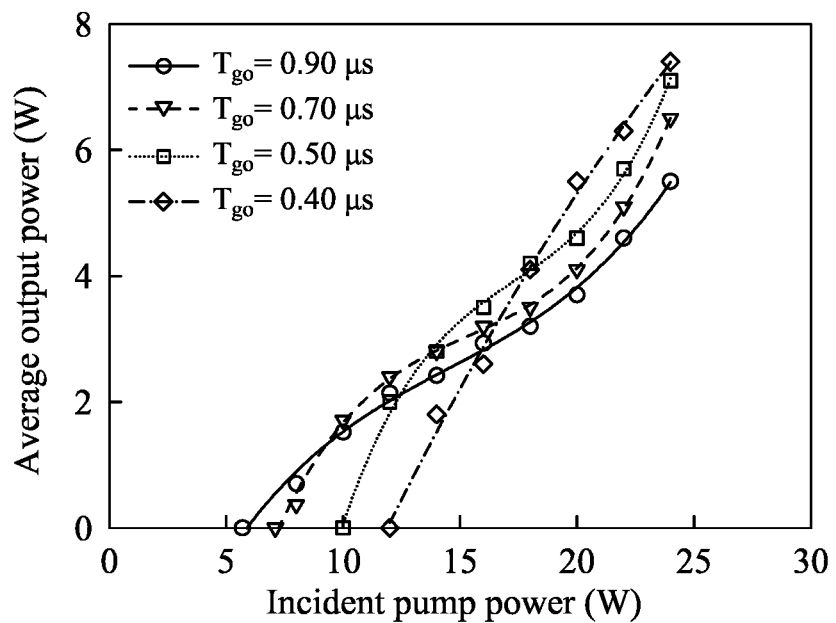
FIG. 6 shows a schematic diagram of the output power at a pulse repetition rate of 400 KHz of a laser device made according to an embodiment of the present invention.
Figure 7:
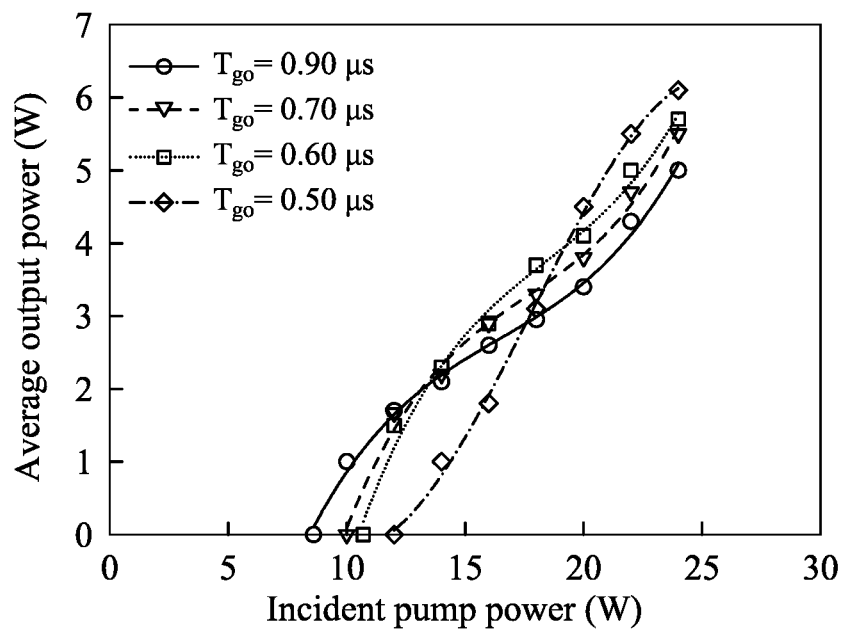
FIG. 7 shows a schematic diagram of the output power at a pulse repetition rate of 500 KHz of a laser device made according to an embodiment of the present invention.

FIGS. 5-7 show the experimental data on the pulsed light output power with the output light wavelength of about 588 nanometers, trying different turn-on time Tgo of the incident pumping light $L_{pump}$ power at a pulse repetition rate of 300/400/500 KHz respectively by the laser device made according to the present invention. Comparing the data obtained with different turn-on times of Tgo, one can get the same observation and conclusion as that of the previous paragraph. By controlling the turn-on time Tgo of the acousto-optic crystal 140, the present invention can make use of the low-power incident pumping light $L_{pump}$ to generate laser pulse with high pulse repetition rate, and can increase the pulsed light output power when necessary.

There is only the first LBO crystal 160 configured in the linear cavity 210 to receive the first and second infrared base laser lights $L_{base1}$, $L_{base2}$ from the gain and Raman medium 120 and generate the visible laser light L1 of the third wavelength (for example, 588 nm, 559 nm or 532 nm) in the previously mentioned embodiment. Please refer to FIG. 2 again. In order to realize multi-wavelength pulsed laser light, a second LBO crystal 170 and/or a third LBO crystal 180 can also be added to the linear cavity 210. These two or three LBO crystals 160, 170, 180 can receive the first or second infrared basic laser lights $L_{base1}$, $L_{base2}$ to perform doubling harmonic or sum frequency respectively to generate visible laser light L1, L2, L3 of different wavelengths (for example, 588 nm, 559 nm or 532 nm), and the output laser pulse lights $L_{1ext}$, $L_{2ext}$, $L_{3ext}$ can be respectively generated during the turn-on time Tgo of the acousto-optic crystal 140.

The foregoing embodiment is to obtain output laser pulse light with a wavelength in the range of visible lights. According to different embodiments, as long as two of the first LBO crystal 160, the second LBO crystal 170 and the third LBO crystal 180 in FIG. 2 are configured as appropriate doubling harmonic generation crystals, the present invention can also be configured to obtain a wavelength of pulsed output laser light in the ultraviolet range.

For example, in the linear cavity 210, disposing the second LBO crystal 170 will double harmonic the first infrared base laser light $L_{base1}$ with wavelengths at about 1064 nm to be a visible laser light L2 with wavelength about 532 nm, and disposing the third LBO crystal 180 will double harmonic the visible laser light L2 to be an ultraviolet laser light L1.

The first optical element 130 is highly reflective for the first wave band covering the wavelengths of the first and second infrared base laser lights $L_{base1}$, $L_{base2}$ (for example, 1060-1180 nm) in the second direction, and is also highly reflective for the second waveband covering the wavelengths of L1 and L2 (for example, 260-560 nm). The film stack 151 of the second optical element 150 has a relatively low initial transmittance. When the intensity of the ultraviolet laser light L1 or the visible laser light L2 reaches a threshold, the film stack 151 of the second optical element 150 facing in the first direction has high transmittance for the lights with a wavelength within the second waveband, so that an output laser pulse $L_{1ext}$ or $L_{2ext}$ is emitted along the first direction. According to an embodiment, the intensity of the ultraviolet laser light L1 or the visible laser light L2 reaches the threshold during the turn-on time Tgo of the acousto-optic crystal 140. According to another embodiment, the visible laser light can also be doubled by the LBO crystal after the sum frequency, or the frequency doubled harmonic and then summed frequency can form ultraviolet laser lights of different wavelengths.

Based on the above, the high pulse repetition rate laser 200 according to the present invention has a linear cavity 210 which can be flexibly configured with zero or one or even multiple LBO crystals 160, 170, 180 to obtain infrared, visible or ultraviolet output laser lights with high pulse repetition rate. Because the transparent state of the acousto-optic crystal 140 in the linear cavity 210 can be instantly controlled by the radio frequency control signal $S_{control}$ of a specific frequency, the acousto-optic crystal 140 can be used as a shutter, as long as the signal period Tp and the low level period in the signal period Tp corresponding to the turn-on time Tgo of the acousto-optic crystal 140 are set accordingly, the linear cavity 210 can accumulate energy during the high level period in the signal period Tp. Thus, it can successfully generate pulsed laser light with high pulse repetition rate even if the power of the incident pump light $L_{pump}$ is not high.

Figure 8:
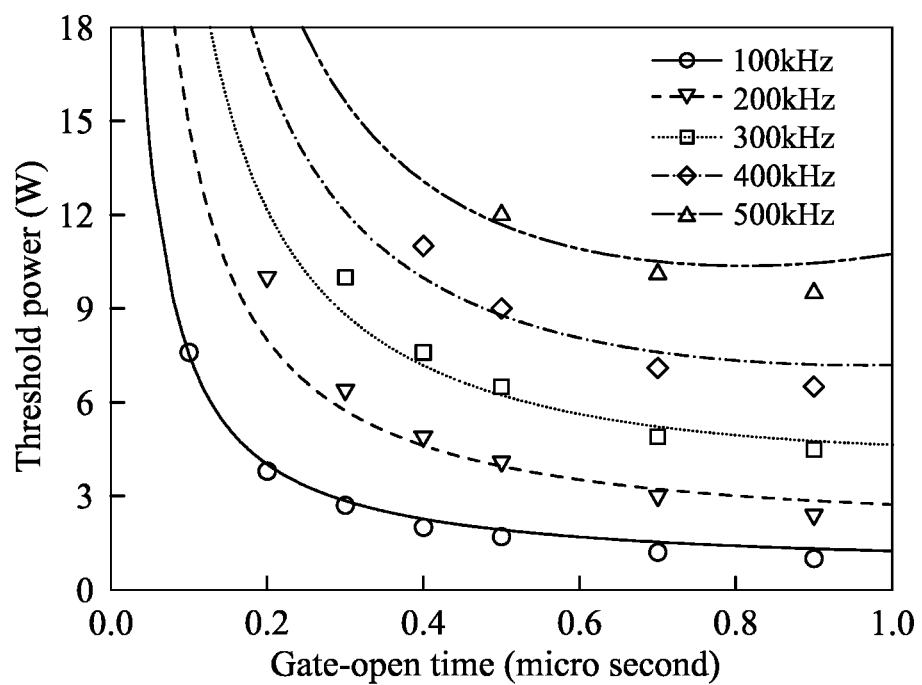
FIG. 8 shows a schematic diagram of the correlation between the gate-open time and the threshold power of the laser device made according to an embodiment of the present invention under various high pulse repetition rates.

Please refer to FIG. 8, which shows the correlation between the turn-on time and the power threshold of the laser device with an output light wavelength of about 588 nm made according to an embodiment of the present invention under various high pulse repetition rates. The figure shows the experimental data as denoted in symbols, while each curve is estimated based on mathematical modeling of the theory in this technical field. It is observed that the experimental data comply with the estimation according to the modeling of the theory.

However, for the relatively high frequency pulse repetition rate of 400 KHz or 500 KHz, the data that can realize the output of pulsed light shows that there exists the lowest opening time of the shutter (for the 500 KHz data is about 0.5 microsecond; for the 400 KHz data is about 0.4 microsecond). In other words, the data confirms the above-mentioned concept that the turn-on time Tgo must be at least greater than the development period $T_{bu}$ of the visible laser light L1. The intensity of the pump light source commonly used in the art is 26 watts, and FIG. 8 shows that the present invention can use a pumping light source with intensity of less than 15 watts or even lower to achieve a pulsed laser light with high pulse repetition rate, which is a huge technical innovation.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A high repetition rate pulse laser including a linear cavity having a first direction and a second direction opposite to the first direction, comprising along the first direction:
    a first optical component allowing a pumping light incident in the first direction to transmit therethrough;
    a gain and Raman medium receiving the pumping light from the first optical component, and generating a first infrared base laser light having a first wavelength and a second infrared base laser light having a second wavelength;
    an acousto-optic crystal receiving a radio frequency control signal from a radio frequency controller, wherein the radio frequency control signal has a signal period including a low level period and a high level period, and the acousto-optic crystal undergoes a corresponding turn-on time to allow any light to pass therethrough during the low level period;
    a first lithium triborate (LBO) crystal receiving the first and the second infrared base lasers, and generating a visible laser light having a third wavelength; and
    a second optical component, wherein:
    the first optical component has a first high reflectivity for a first wave band covering the first and the second wavelengths in respect of the second direction and a second high reflectivity for a second wave band covering the third wavelength;
    the gain and Raman medium has a first high transmittance for the first wave band and a third high reflectivity for the second wave band in respect of the second direction;
    the second optical component has a fourth high reflectivity for the first wave band and an initial transmittance, and when an intensity of the visible laser light reaches a threshold, the second optical component has a second high transmittance for the second wavelength in respect of the first direction so as to release an output laser pulse along the first direction; and
    the intensity of the visible laser light achieves the threshold during the turn-on time of the acousto-optic crystal.

2. The pulse laser device according to claim 1, wherein the gain and Raman medium includes a neodymium doped vanadate and the second infrared base laser light is generated via a self-stimulated Raman scattering.

3. The pulse laser device according to claim 1, wherein the first wave length and the second wavelength are approximately 1064 nm and 1176 nm respectively.

4. The pulse laser device according to claim 1, wherein the third wavelength is approximately 588 nm or 532 nm when the first LBO is a doubling harmonic generation crystal.

5. The pulse laser device according to claim 1, wherein the third wavelength is approximately 549 nm when the first LBO crystal is a sum frequency generation crystal.

6. The pulse laser device according to claim 1, wherein the linear cavity further comprises a second LBO crystal disposed between the acousto-optic crystal and the first LBO crystal.

7. The pulse laser device according to claim 6, wherein the second LBO crystal is one of a doubling harmonic generation crystal and a sum frequency generation crystal.

8. The pulse laser device according to claim 6, wherein the linear cavity further comprises a third LBO crystal disposed between the first and the second LBO crystals.

9. The pulse laser device according to claim 8, wherein the third LBO crystal is one of a doubling harmonic generation crystal and a sum frequency generation crystal.

10. A linear cavity for generating a high repetition rate laser light, comprising along a first direction:
    a first optical component allowing a pumping light incident in the first direction to transmit therethrough;
    a gain and Raman medium receiving the pumping light from the first optical component, and generating a first infrared base laser light having a first wavelength and a second infrared base laser light having a second wavelength;
    an acousto-optic crystal receiving a radio frequency control signal from a radio frequency controller, wherein the radio frequency control signal has a signal period including a low level period and a high level period, and the acousto-optic crystal undergoes a corresponding turn-on time to allow any light to pass therethrough during the low level period;

a first lithium triborate (LBO) crystal receiving the first and the second infrared base lasers, and generating a first visible laser light having a third wavelength;

a second LBO crystal receiving the first and the second infrared base lasers, and generating an ultraviolet laser light having a fourth wavelength; and a second optical component, wherein:

the first optical component has a first high reflectivity for a first wave band covering the first and the second wavelengths in respect of a second direction opposite to the first direction and a second high reflectivity for a second wave band covering the third and the fourth wavelengths;

the gain and Raman medium has a first high transmittance for the first wave band and a third high reflectivity for the second wave band in respect of the second direction;

the second optical component has a fourth high reflectivity for the first wave band and an initial transmittance, and when an intensity of the ultraviolet laser light reaches a threshold, the second optical component has a second high transmittance for the second wavelength in respect of the first direction, so as to release an output laser pulse along the first direction; and the intensity of the first visible laser light achieves the threshold during the turn-on time of the acousto-optic crystal.

11. The linear cavity according to claim 10, wherein the gain and Raman medium includes a neodymium doped vanadate and the second infrared base laser light is generated via a self-stimulated Raman scattering.

12. The linear cavity according to claim 10, wherein the first wave length and the second wavelength are approximately 1064 nm and 1176 nm respectively.

13. The linear cavity according to claim 10, wherein the first LBO crystal and the second LBO crystal are a sum frequency generation crystal and a doubling harmonic generation crystal respectively when the first wavelength is twice as long as the third wavelength.

14. The linear cavity according to claim 10, wherein the first LBO crystal and the second LBO crystal are a doubling harmonic generation crystal and a sum frequency generation crystal respectively when the second wavelength is twice as long as the third wavelength.

15. The linear cavity according to claim 10, further comprising a third LBO crystal disposed between the gain and Raman medium and the first LBO crystal, receiving the first and the second infrared base laser lights, and generating a second visible laser having a fifth wavelength falling in the second wave band.

16. A high repetition rate pulse laser including a linear cavity having a first direction and a second direction opposite to the first direction, comprising along the first direction:

a first optical component receiving a pumping light incident in the first direction, and allowing the pumping light to transmit therethrough, wherein the pumping light has a first wavelength;

a gain medium receiving the pumping light from the first optical component, and generating a base laser light having a second wavelength;

an acousto-optic crystal receiving the base laser light from the gain medium, and receiving a radio frequency control signal to determine whether the acousto-optic crystal is at a transparent condition or a non-transparent condition based on the radio frequency control signal; and a second optical component configured to form therebetween a laser resonant cavity with the first optical component, wherein the second optical component has a light-intensity threshold for the base laser light to be transmitted therethrough, and an intensity of the base laser light reaches the light-intensity threshold when the acousto-optic crystal is under the transparent condition.

17. The laser apparatus according to claim 16, wherein the gain medium includes a neodymium doped vanadate, and the base laser light is an infrared laser light.

18. The laser apparatus according to claim 16, wherein the radio frequency control signal has a signal period including a low level period and a high level period, and the acousto-optic crystal undergoes a corresponding turn-on time to allow any light to pass therethrough during one of the low level period and the high level period.

19. The laser apparatus according to claim 18, wherein the intensity of the base laser light reaches the light-intensity threshold during the corresponding turn-on time.

20. The laser apparatus according to claim 16, wherein:

the first optical component has a first high reflectivity for a first wave band covering the second wavelength in respect of the second direction;

the gain medium has a first high transmittance for the first wave band and a third high reflectivity for the second wave band in respect of the second direction; and the second optical component has a second high reflectivity for the first wave band in respect of the first direction and an initial transmittance, and has a third high transmittance when the intensity of the base laser light reaches the light-intensity threshold.

* * * * *